June 21, 1932.  A. S. CARLSON  1,864,120
WATER HEATER
Filed Nov. 14, 1930
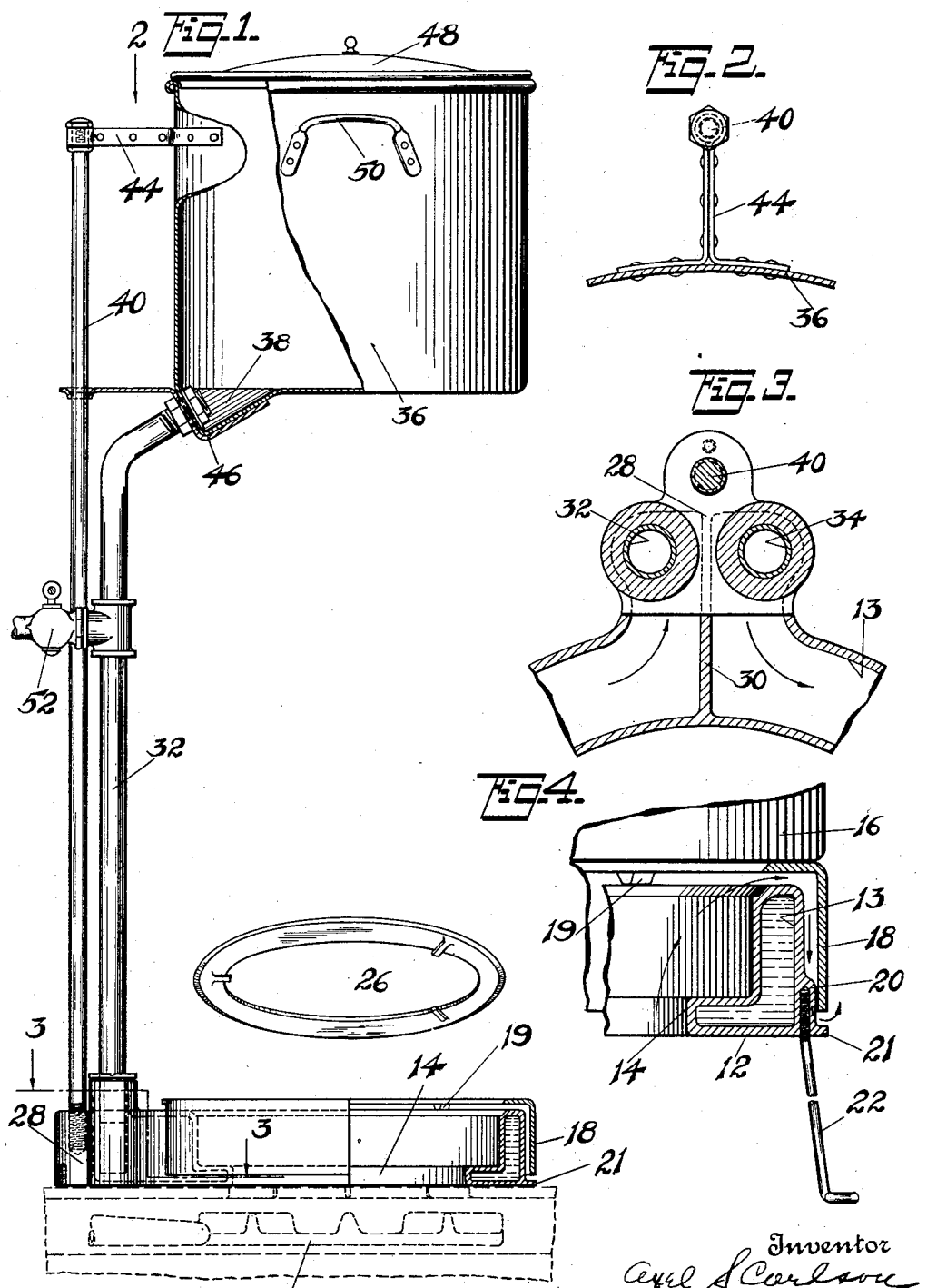

Patented June 21, 1932

1,864,120

UNITED STATES PATENT OFFICE

AXEL S. CARLSON, OF BROOKLYN, NEW YORK

WATER HEATER

Application filed November 14, 1930. Serial No. 495,579.

The present invention relates to water heaters.

A principal object of the invention is to provide a relatively small, portable, light-weight water heater unit comprising a tank and a circulating system, part of which serves as a stand to support the unit with respect to a source of heat, the stand being formed as a cooking utensil support.

Another object of the invention is to provide, in combination with the unit, a deflector element adapted to operate with the standing portion of the unit for deflecting heating currents against the base portion of the water circulating system and also adapted to support a cooking utensil.

Other objects include the provision of such a water heater unit in which the water tank overlies the base but is spaced therefrom to permit the insertion of a cooking utensil between the tank and the base and resting on the base.

Other objects and advantages of the invention will appear from the following description taken in connection with the accompanying drawing which illustrates a preferred embodiment of the invention and in which:

Figure 1 is a side elevation, partly in section, of a small, portable, light-weight water heater unit constructed in accordance with the invention;

Figure 2 is a fragmentary detail view showing part of the tank support;

Figure 3 is an enlarged fragmentary horizontal sectional view illustrating part of the circulating system; and Figure 4 is a fragmentary vertical sectional view illustrating the use of the device over a source of heat such as a camp fire.

Referring in detail to the drawing, a circular base 12 forms a water heating conduit 13 and is provided with a central opening 14 so that heating currents can pass vertically therethrough. The base conduit is shown as being L-shaped in cross section and is formed with a circular upper surface for the purpose of supporting a cooking utensil 16.

The invention provides, for optional use in connection with the base, a deflector 18 supported on the base by lugs 19 extending downwardly from the deflector, thus providing a space for the passage of heating currents indicated by the arrows in Figure 4. The deflector 18 is provided with a downwardly extending annular flange spaced from the outer wall of the base conduit to deflect the heating currents downwardly along the outer wall of the base for the purpose of increasing the water heating effect. The deflector is spaced from the outer vertical wall of the base by the laterally offset leg-receiving portions 20 formed at spaced intervals around the lower outside wall of the base and provided with threaded openings for the reception of legs 22 which may be used with the device in case, for example, the heat is supplied by a camp fire. Ordinarily, however, where the invention is to be used on a stove, the legs 22 are removed so that the supporting base may be supported on a gas stove, such, for example, as the stove 24 indicated in dotted lines in Fig. 1. In this case, it may be advantageous to use the deflector 18 but it may be desirable to dispense with the deflector where the fuel source produces smoke. When the deflector is used, the horizontal flange 21 extending outwardly around the bottom of the base increases the down draft between the deflector and base.

An adapter ring 26 may be provided for use in connection with the circular central opening 14 provided in the base, the adapter fitting directly on top of the base or, where the deflector is used, directly on top of the deflector.

The base 12 is provided with a laterally offset portion 28 having in its top two passages communicating with the base conduit adjacent to but on opposite sides of the wall 30, extending across the base conduit 13.

Two vertical pipes 32, 34, extend upwardly from the base opening and communicate, at their upper ends, with the interior of a water reservoir 36. The pipe 34 extends downwardly in the base reservoir and near the bottom thereof whereas the pipe 32 stops near the top, as indicated in dotted lines in Fig. 1.

The reservoir 36 may be formed with a depression 38 in its bottom for the purpose of receiving the attached ends of the pipes 32 and 34. These pipes, by their attachment, may provide a structure sufficiently rigid to support the reservoir on the base though I prefer to use, in addition to the pipes, a vertical supporting rod or pipe 40 threaded into an offset 42 in the base and carrying, at its upper end, a bracket 44 attached to the upper portion of the reservoir, as illustrated in Figure 2. An attaching plate 46 may be secured on rod 40 and be formed to fit under the depression 38 in the reservoir so that the conduit pipes 32 and 34 pass through the plate 46 and into the reservoir depression. This construction provides a heater, the parts of which may be readily disassembled.

The reservoir may be provided with a top 48 and side handles 50 by which the assembled unit, as a whole, may be carried.

A faucet 52 may be attached to pipe 32 for the purpose of drawing off the heated water.

As illustrated in Figure 1, the water heater unit constructed as above described, provides, in a single unit, a small, portable water heater in which the supporting base acts as a heating conduit, the reservoir being supported above and directly over the base but spaced therefrom so that a cooking utensil may be supported on the base in line with and below the reservoir. The base serves not only as a water conduit but also as a reservoir support and cooking utensil support, providing a substantial base for supporting the unit vertically in stable equilibrium.

What is claimed is:

1. A water heater unit comprising a reservoir-supporting base having an opening therethrough, and forming a water heating conduit around said opening, said base being formed on its top as a support for holding a cooking utensil over said opening, a support extending upwardly from said base, a reservoir secured to said support and held by it over said base, leaving a utensil receiving opening therebetween, a wall extending across the conduit in said base, said base having inlet and outlet openings on opposite sides of said wall, pipes connecting said openings with said reservoir, and a heating-current deflector associated with said base for deflecting heating currents coming up through said base opening in a downward direction adjacent and outside of said base.

2. A water heater unit comprising a reservoir-supporting base having an opening therethrough and forming a water-heating conduit around said opening, said conduit having a utensil supporting top portion, a reservoir carried above and overlying said base, leaving a utensil receiving space therebetween, pipes connecting said reservoir with the water heating conduit in the base and forming therewith a water circulating system, said base being formed exteriorly with laterally offset leg-receiving portions, and a heating-current deflector associated with and extending around said base, and having a depending flange spaced away from said base by said laterally offset leg-receiving portions.

3. A water heater unit comprising a reservoir-supporting base having an opening therethrough and forming a water-heating conduit around said opening, said conduit having a utensil supporting top portion, a reservoir carried above and overlying said base, leaving a utensil receiving space therebetween, pipes connecting said reservoir with the water heating conduit in the base and forming therewith a water circulating system, said base being formed exteriorly with laterally offset leg-receiving portions, and a heating-current deflector associated with and extending around said base, and having a depending flange spaced away from said base by said laterally offset leg-receiving portions, said base having an outwardly extending flange cooperating with said deflector for increasing the draft of down currents between said deflector and said base.

In testimony whereof, I have hereunto set my hand.

AXEL S. CARLSON.